Jan. 24, 1967  H. NEWMAN ET AL  3,299,553

CHANGEABLE MESSAGE DISPLAY

Filed Sept. 27, 1965   3 Sheets-Sheet 1

INVENTORS
HERMAN NEWMAN
DAVID COBY
BY
ATTORNEY

Jan. 24, 1967   H. NEWMAN ET AL   3,299,553
CHANGEABLE MESSAGE DISPLAY
Filed Sept. 27, 1965   3 Sheets-Sheet 2
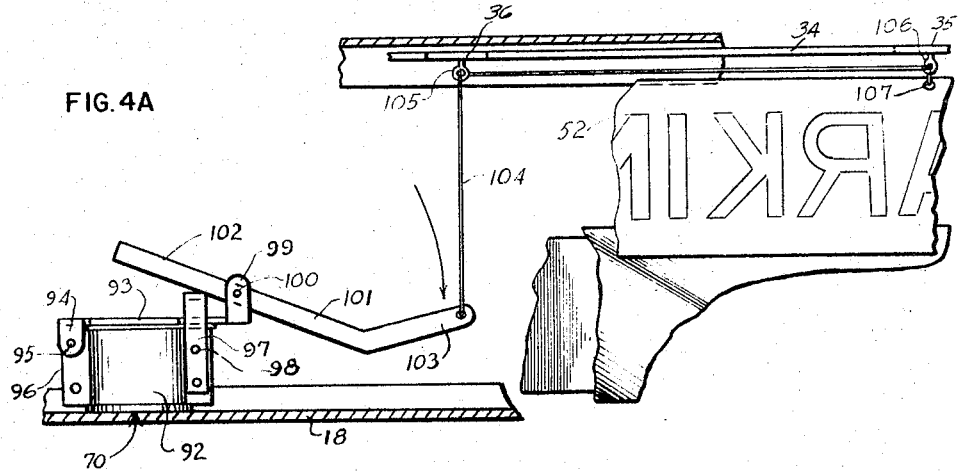
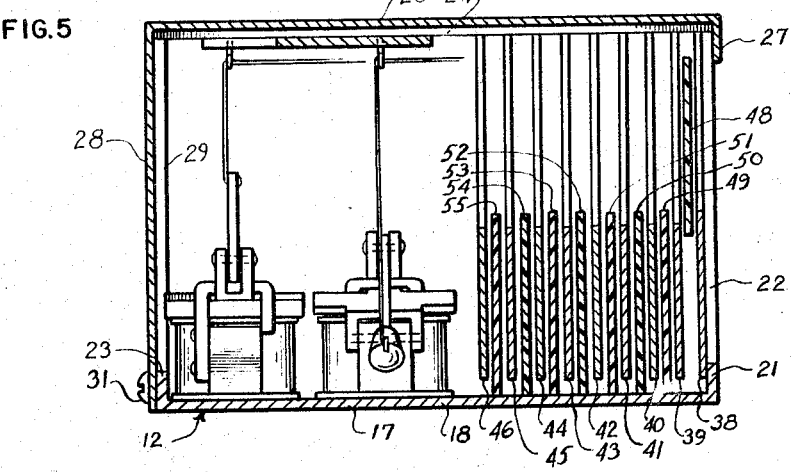
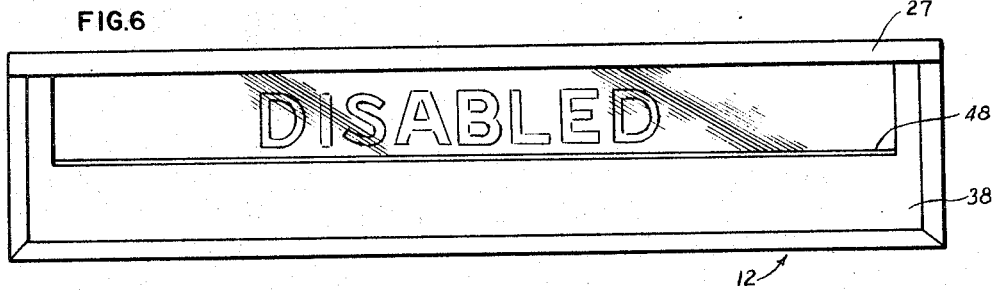
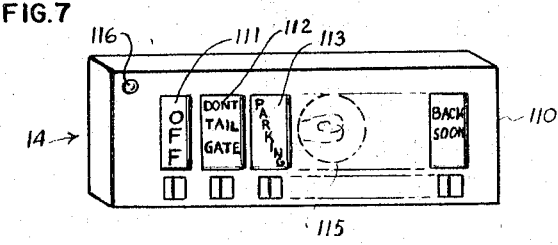
INVENTORS
HERMAN NEWMAN
DAVID COBY
BY
ATTORNEY

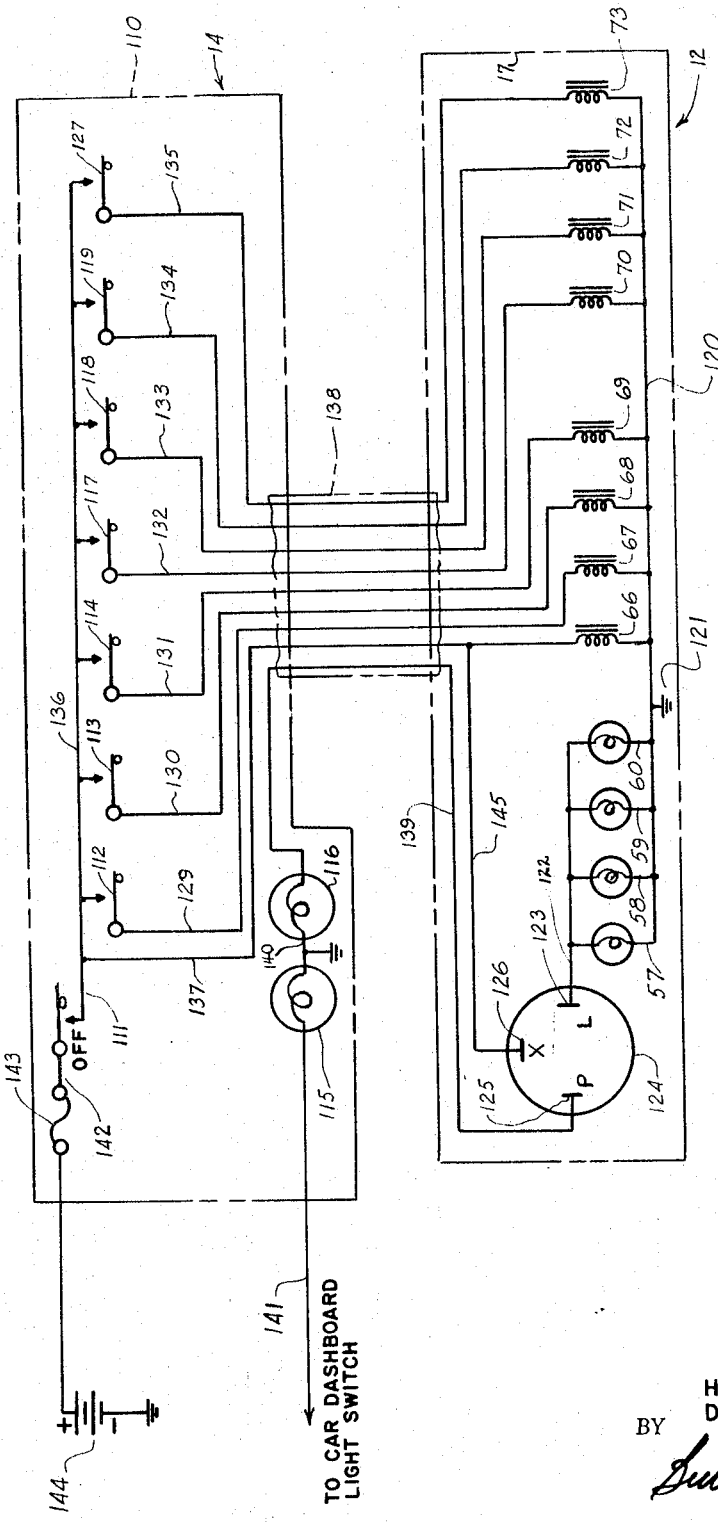

United States Patent Office 3,299,553
Patented Jan. 24, 1967

3,299,553
CHANGEABLE MESSAGE DISPLAY
Herman Newman, Bronx, N.Y. (97—30 57th Ave., Rego Park, N.Y. 11368), and David Coby, New York, N.Y. (19984 Hartwell Ave., Detroit, Mich. 48235)
Filed Sept. 27, 1965, Ser. No. 490,216
11 Claims. (Cl. 40—52)

This invention relates generally to changeable displays for vehicles, and is especially concerned with a unique and highly improved construction of message flasher for automotive vehicles. The instant application is a continuation-in-part of copending patent applications Serial No. 289,271, filed June 20, 1963, now Patent No. 3,226,707, issued December 28, 1965; Serial No. 295,043, filed July 15, 1963, and now abanboned; and Serial No. 377,366, filed June 23, 1964.

As is well known, present automotive traffic congestion and other conditions of automotive traffic greatly increase the need for communication between drivers. While certain attempts at such communication have been made in the past, only limited success has been achieved, and much greater degree of communication is desirable.

Toward this end, it is an important object of the present invention to provide a message flasher for a vehicle, which communicates a desired message to the operator of a rearward vehicle in a most attention-attracting manner.

It is still a further object of the present invention to provide a message-communication device for use in automotive vehicles which is extremely simple to operate, requiring only the push of a button, is foolproof in use, and wherein its operation is effectively signaled both to the drivers of adjacent vehicles, as well as the operator of the message-sending vehicle.

It is still a further object of the present invention to provide a message-transmitting device for automotive vehicles, which is extremely simple in construction, durable and reliable throughout a long useful life, and which can be economically manufactured and installed, for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 4a is a partial sectional elevational view taken generally along the line 4a—4a of FIGURE 2, somewhat enlarged and partially broken away, to show construction and operation of another solenoid.

FIGURE 5 is a transverse sectional elevational view taken generally along the line 5—5 of FIGURE 3;

FIGURE 6 is a front elevational view showing the display device of the instant invention;

FIGURE 7 is a front perspective view showing a control unit of the instant message-display device; and FIGURE 8 is a schematic representation of the electrical system of the instant device.

Figure 1:
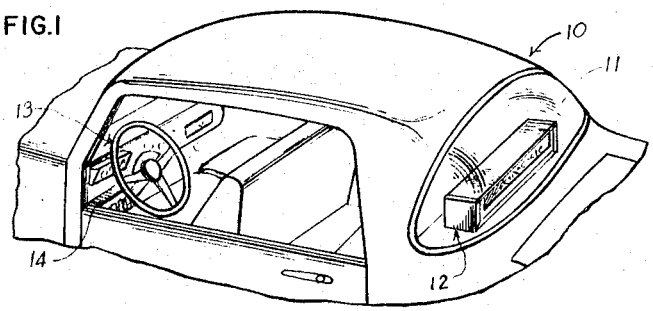
FIGURE 1 is a partial perspective view illustrating a vehicle having a changeable display constructed in accordance with the teachings of the present invention.

Referring now more particularly to the drawings, and specifically to FIGURE 1 thereof, a vehicle is there generally designated 10, and may include a rear window 11, interiorly of which is located a message-display device 12 constructed in accordance with the teachings of the present invention. Also in the vehicle 10, adjacent to the steering station 13, is advantageously mounted a control unit 14 for actuation of the message-display unit 12.

Figure 2:
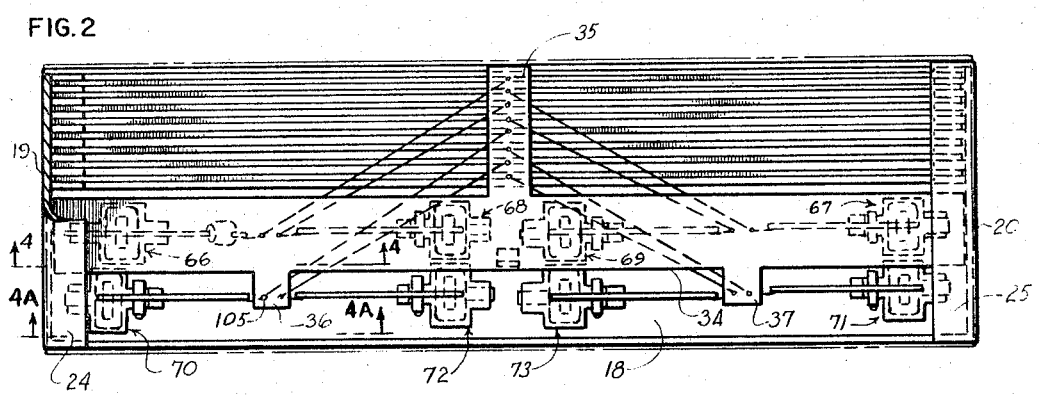
FIGURE 2 is a top plan view of the message-display device of the present invention, with the top panel removed, and partly broken away for clarity of illustration.
Figure 3:
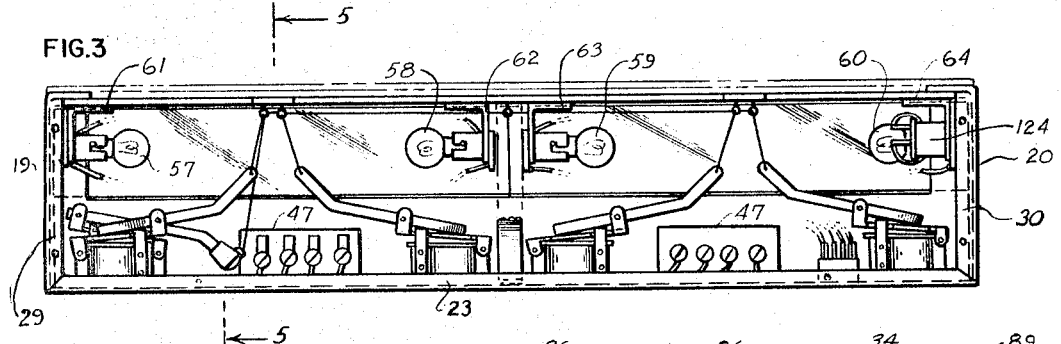
FIGURE 3 is a rear elevational view of the device of FIGURE 2, with the rear panel removed.

Referring now to FIGURES 2, 3 and 5, the message-display unit 12 includes a housing 17 having a generally rectangular bottom wall 18 and end walls 19 and 20 upstanding from opposite ends of the bottom wall. A front wall 21 extends along the front side of the bottom wall 18, upstanding therefrom between the end walls 19 and 20, and is provided with a thru opening or window 22. A rear flange 23 extends along and upstands from the rear side of the bottom wall 18, and a pair of top flanges 24 and 25 extend inward from upper edges of the end walls 19 and 20. Extending across the top of the housing 17, overlying the flanges 24 and 25, is a top wall 26, which may have a depending forward flange 27 extending in front of the front wall 21. A rear wall 28 may depend from the rear side of the top wall 26 to overlap the lower flange 23. A pair of side flanges 29 and 30 may extend inward from the rear sides of end walls 19 and 20, respectively, and the housing may be secured together by fasteners 31 extending through the rear wall 28 and into the flanges 23, 29 and 30. As illustrated in FIGURES 2 and 3, the integral housing top 26 and rear wall 28 have been removed to expose the interior of the housing.

A generally flat upper support member 34 extends longitudinally within the housing 17, in an upper rear region thereof, having its opposite ends secured, as by welding or other suitable securing means, to the undersides of respective upper flanges 24 and 25. The upper support member 34 may be of an elongate, generally rectangular formation, and provided centrally with a forwardly extending portion 35. Adjacent to but spaced in from each end of the upper support 34 there may be provided thereon a pair of rearwardly extending projections 36 and 37.

In a lower forward region of the housing 17 there are fixedly secured, by any suitable means, a plurality of longitudinally extending, upstanding guide plates 38, 39, 40, 41, 42, 43, 44, 45 and 46. The guide plates 38–46 are disposed in parallel spaced, upstanding relation behind the window 22 and extend upward across the lower portion of the window. More specifically, the forwardmost guide plate 38 extends across the lower portion of the window 22. At opposite ends, the guide plates 38–46 may be secured to housing end walls 19 and 20, and provided with upstanding extensions coplanar with the respective guide plate. In addition, terminal mounting members or blocks 47 may be fixedly secured to and upstand from the housing bottom wall 18, rearward of the rearmost guide plate 46.

It will now be appreciated that the spaces between adjacent pairs of guide plates 38–46 serve to define guideways, and that a plurality of panels 48, 49, 50, 51, 52, 53, 54 and 55 may be interposed in the interguide-plate spaces and mounted thereby for movement in respective vertical planes between raised and lowered positions. The forwardmost panel 48 may be of opaque construction and, when raised as seen in FIGURE 5, serves as a shutter to close the window 22. The remaining panels 49–55 may each be provided with an imprinted message, as by having the letters cut out or printed or painted on a transparent or translucent material removed from the panel for light-permeability therethrough. The panels 49–55 may each be selectively raised, and the shutter panel 48 simultaneously lowered, to present the selected message or display panel for view through window 22; and, a plurality of electric lamps 57, 58, 59 and 60 (see FIGURE 3) are located interiorly of the housing 17 to provide illumination through a raised display panel for enhanced viewing of the panel through the window 22. The lamps 57–60 may be arranged in spaced relation longitudinally along the interior of the housing 17, and respectively carried by depending brackets 61, 62, 63 and 64 secured to and supported by the upper support 34.

Figure 4:
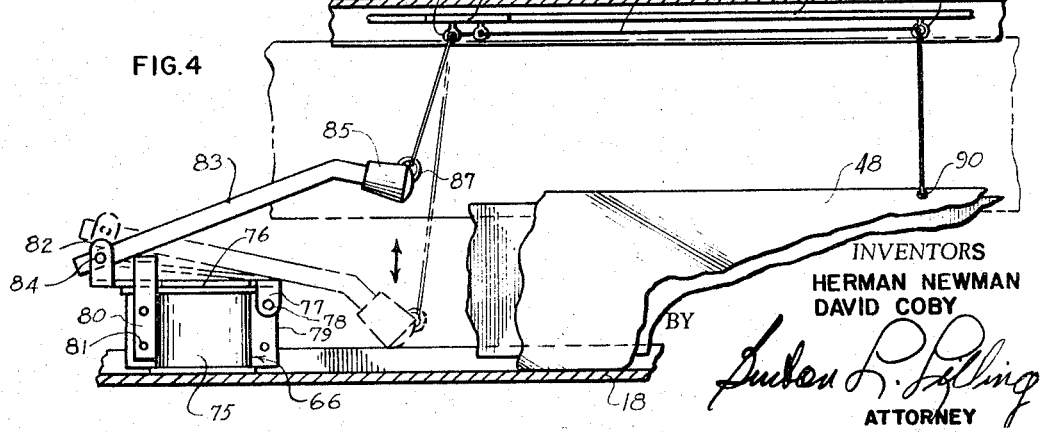
FIGURE 4 is a partial sectional elevational view taken generally along the line 4—4 of FIGURE 2, somewhat enlarged and partially broken away, different positions of operation being shown in solid and dot-and-dash outline.

In the lower rearward region of the housing 17 there are located a plurality of electro-magnetic devices or solenoids 66, 67, 68, 69, 70, 71, 72 and 73. The solenoid 66 is best seen in FIGURE 4, and includes a coil 75 mounted on and upstanding from the housing bottom wall 18. At the upper end of the coil 75 is mounted an arm 76, pivotally connected to the coil, as by a clevis 77 pinned at 78 to an extension 79 of the solenoid 66. The arm 76 is thus swingable about the pivot 78 between the solid and phantom positions shown in FIGURE 4. The arm 76 extends from its pivoted end across the top of the coil 75 and beneath a bridge-like fulcrum 80 secured to the coil, as by fasteners 81. On the distal end of the arm 76, beyond the fulcrum 80, there is an upstanding clevis 82. An operating lever 83 has one end pivotally connected, as by a pin 84 to the upstanding clevis 82 and extends therefrom over the fulcrum 80, across and beyond the coil 75. The end of lever 83 remote from pin 84 is advantageously weighted, as at 85 to gravitationally urge the lever 83 downward to its phantom position. Upon energization of the coil 75, the arm 76 is swung downward to its solid-line position, which effects upward swinging movement of the lever 83 about fulcrum 80.

An operating element, such as a flexible elongate member or cord 86, may have one end connected to the weighted end of lever 83, as by eye 87, and extends therefrom upward through an eye 88 depending from the upper support 34. The elongate flexible element 86 extends thence obliquely forward through an eye 89 depending from the forward end of extension 35, and thence downward for connection to the shutter 48, as at 90. It will, therefore, be understood that the shutter 48 is normally in its elevated position, in closing relation with respect to the window 22, as by action of the weight 85 drawing the adjacent end of flexible element 86 downward, and thereby raising the shutter. Upon energization of coil 75, the lever 83 is raised to permit gravitational downward movement of the shutter 48.

The electro-magnetic mechanism or solenoid 70, as seen in FIGURE 4a, is somewhat similar, including a coil 92 upstanding from the housing bottom wall 18 and provided at its upper end with a transverse arm 93 having at one end a depending clevis 94 pivoted, as by pin 95 to an extension 96 of the solenoid 70. The arm 93 extends across the solenoid from its pivoted end through and beneath a bridge-like fulcrum 97 which is fixed to the solenoid, as by fasteners 98. The end of the arm 93 extending beyond the fulcrum 97 is provided with an upstanding clevis 99 which is pivotally connected, as by pin 100 to a lever 101 intermediate the ends of the latter. That is, the lever 101 extends from its pivotal connection 100 in one direcion over the fulcrum 97, as at 102, and extends in the other direction from pivot 100 to an end 103 which is connected to a flexible operating element or cord 104. The cord 104 extends upward from the arm end 103 through an eye 105 depending from extension 36 of upper support 34. The cord 104 extends thence obliquely forward slidably through an eye 106 depending from the forward upper support extension 35, and thence downward for connection at 107 to one of the panels, panel 52 in the instant embodiment. Thus, solenoid 70 is similar in its operation to solenoid 66, but in the opposite manner. That is, upon energization of coil 92 to lower arm 93 (the illustrated position in FIGURE 4a) the lever 101 is rotated about fulcrum 97 to lower the lever end 103, which effects raising of display panel 52. De-energization of coil 92 permits upward movement of arm 93 and consequent upward movement of lever end 103 for gravitational lowering of panel 52.

By construction similar to that of solenoid 70, the solenoids 67, 68, 69, 71, 72 and 73 are each respectively connected through pivoted arms and flexible elongate cords to respective display panels 49, 50, 51, 53, 54, and 55. Hence, energization of any of the solenoids 67–73 serves to raise the associated panels 49–55, and de-energization serves to lower the associated panel.

The respective panels 49–55 may each be cut out or printed or painted to present to view through window 22 a particular message, such as the message "DISABLED" in FIGURE 6. Other suitable messages may include "DON'T TAIL GATE," "CAREFUL PLEASE," "DON'T BLOW HORN," "PARKING," "SLOW DOWN," and "BACK SOON." Of course, the particular raised or elevated display panel 49–55 is interposed between the window 22 and the illuminating lamps 57–60; and, the letters of the particular message may be transparent colored material, such as plastic or the like, for enhanced visibility.

In FIGURE 7 is shown the control unit 14, apart from the vehicle 10. The control unit includes a casing or housing 110 having in its front wall a plurality of switch buttons 111, 112, 113, and others, for selective actuation by a vehicle operator. The switch buttons 111–113 may be provided with marking indicating their function, as illustrated, and an interior illuminating lamp 115 may be provided to illuminate the button markings. In addition, a pilot lamp 116 may be mounted in the housing 110 for indicating operation of the message display.

The electrical system of the instant invention is shown in FIGURE 8, the display-unit housing being diagrammatically represented at 17 and containing the several electromagnets or solenoids 66–73. The coils of the several solenoids 66–73 are all connected together at one side by a conductor 120 which is grounded at 121. The grounded conductor 120 may also be connected to one side of each of the display-illuminating lamps 57–60. The other sides of the lamps 57–60 may all be connected together, as by a conductor 122 which is in turn connected to an output terminal 123 of a flasher unit or switch 124. The flasher unit 124 includes a second output terminal 125, and a power input terminal 126.

The control-unit housnig 110 is diagrammatically represented, and shown therein are a plurality of selectively actuable switches 112, 113, 114, 117, 118, 119, and 127. These switches are respectively connected on one side to each of the coils of solenoids 67–73, as by respective conductors 129, 130, 131, 133, 134 and 135. The other sides of the several switches 112, 113, 114, 117, 118, 119, and 127 are all connected together, as by a conductor 136 which is, in turn, connected to one side of the on-off switch 111. In practice, as by mechanical interlock, closure of any selected one of switches 112, 113, 114, 117, 118, 119 or 127 serves to close switch 111. The switch 111 is connected, as by conductor 137, to the input side of solenoid 66, so that energization of any of the solenoids 67–73 automatically energizes the solenoid 66.

Also mounted in the control-unit housing 110 may be the pilot lamp 116, and illuminating lamp 115. A conductor 139 may be connected between the flasher terminal 125 and the side of the pilot lamp 116, the other side of the pilot lamp being connected to ground by a conductor 140, which provides a common ground for the lamp 115. The other side of the lamp 115 may be connected by a conductor 141 to the dashboard light switch of the vehicle. The input of on-off switch 111 is connected by a conductor 142, having a fuse 143, to one side of a power source or battery 144, which may be the car battery. The conductor 137 between on-off switch 111 and shutter solenoid 66 is provided with a branch conductor 145 connected to the input or power terminal 126 of the flasher 124.

The conductors 129, 130, 131, 132, 133, 134, 135, 137 and 139 may be banded together to define a connecting cable 138 extending between the control box 14 and display unit 12.

It will now be appreciated that operation of any selected actuating switch 112, 113, 114, 117, 118, 119 or 127 serves to close the actuated switch, as well as the power switch 111, whereby the solenoid selected from group 67–73 is energized simultaneously with the shutter solenoid 66. Thus, the shutter will be opened and the selected panel 49–55 raised to a viewing position. Simultaneously the lamps 57–60 will be flashed by flasher 124 to illuminate the raised display panel. The pilot lamp 116 at the control unit 14 will flash to indicate the operation of the display unit, and the lamp 115 will illuminate the control unit. Operation of the device may be stopped by opening of the switch 111 to remove power from the system and de-energize the previously energized solenoids.

From the foregoing, it is seen that the present invention provides a changeable display device for a vehicle which fully accomplishes its intended objects and is well adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

What is claimed is:

1. A changeable message display, said display comprising a housing having a viewing window, a shutter in said housing in closing relation with said window and mounted for alternate movement out of the viewing plane of said window into a second plane in said housing, a plurality of displays mounted in said second plane of said housing for selective independent movement into and out of said first viewing plane of said window, a first operating means associated with said shutter, a plurality of second operating means respectively associated with each of said displays to effect movement of the same, and a plurality of actuating means respectively connected to each of said second operating means of said displays, all of said plurality of actuating means being connected to the said first operating means of said shutter, whereby, by the actuation of any of said actuating means the said shutter is moved out of the viewing plane of said window and into said second plane and a corresponding display will move out of said second plane into the said viewing plane of said window, and, the de-actuation of the actuating means will move the said shutter out of the said second plane into the said viewing plane and the said display will move out of said viewing plane and into the said second plane.

2. A changeable message display according to claim 1, in combination with illuminating means in said housing and connected to said actuating means for illuminating said displays upon actuation thereof and upon movement of the said display into said viewing plane.

3. A changeable message display according to claim 1, said first and second operating means each being electro-magnetic devices, said first operating means comprising a coil, a bridge-like fulcrum secured to said electro-magnetic device and extending higher than the top of said coil, an arm pivotally connected to said electro-magnetic device and extending across the top of said coil and beneath said fulcrum, a lever pivotally connected at one end thereof to the distal end of said arm and extending therefrom over the said fulcrum and being weighted to counterbalance the weight of said shutter and being operatively connected to said shutter; and, each of said second operating means comprising a coil, a bridge-like fulcrum secured to said electro-magnetic device and extending higher than the top of said coil, an arm pivotally connected to said electro-magnetic device and extending across the top of said coil and beneath said fulcrum, a lever pivotally connected intermediate its ends to the distal end of said arm, said lever extending in one direction over said fulcrum and in the opposite direction to an end operatively connected to a corresponding display.

4. A changeable message display according to claim 3, said actuating means comprising switch means connected to each of said second operating means, and interlocking means connected between said first operating means and said switch means for energizing said first operating means upon energization of any of said switch means.

5. A changeable message display according to claim 1, in combination with a control housing remote from said first-mentioned housing for access by an operator, said actuating means being located in said control housing.

6. A changeable message display according to claim 5, in combination with illuminating means in said housing and connected to said actuating means for illuminating said displays upon movement of the latter into said viewing plane, and pilot illuminating means in said control housing and connected to said first-mentioned illuminating means.

7. A changeable message display, said display comprising a housing having a viewing window, a series of generally upright guideways in said housing adjacent to said window, a shutter mounted in one of said guideways for movement into and out of closing relation with said window, a plurality of displays mounted in said guideways for selective independent movement into and out of viewing relation with said window, a plurality of operating mechanisms in said housing respectively connected to said shutter and each of said displays to effect movement of the same, a plurality of electro-magnetic means in said housing respectively connected to each of said display and shutter operating mechanisms to move the same, and a plurality of actuating means respectively connected to the electro-magnetic means associated with each of said displays, said plurality of actuating means each being connected to the electro-magnetic means associated with said shutter for movement of the shutter out of and into said closing relation upon movement of each display into and out of viewing relation.

8. A changeable message display according to claim 7, said operating mechanisms each including an elevating element, and lever means connected to said elevating element and the respective electro-magnetic means for operation by the latter.

9. A changeable message display according to claim 8, said actuating means comprising switch means connected to each of said electro-magnetic means, shutter switch means connected to said electro-magnetic means to said shutter, and interlocking means connected between said shutter switch means and the remaining switch means for energizing the shutter switch means upon energization of any of the remaining switch means.

10. In a display device having a housing and a viewing window and at least one display for alternate movement into and out of viewing relation with respect to said window, electro-magnetic operating means for alternately moving said display, comprising: a coil, a bridge-like fulcrum secured above the top of said coil, an arm pivotally connected to said electro-magnetic operating means and extending across the top of said coil and beneath said fulcrum, a lever pivotally connected intermediate its ends to the distal end of said arm, said lever extending in one direction over said fulcrum and in the opposite direction to an end operatively connected to said display.

11. In a display device having a housing, a viewing window, a shutter in closing relation with said window and mounted for movement out of and into said closing relation, a plurality of displays mounted in said housing for selective independent movement into and out of viewing relation with respect to said window, first operating means associated with said shutter and a plurality of second operating means associated with each of said displays, said first and said second operating means each being an electro-magnetic device; said first operating means comprising a coil, a bridge-like fulcrum secured above the top of said coil, an arm pivotally connected to said electro-magnetic device and extending across the top of said coil and beneath said fulcrum, a lever pivotally connected at one end thereof to the distal end of said arm and extending therefrom over the said fulcrum and being weighted to counter-balance the weight of said shutter and being operatively connected to said shutter; and, each of said second operating means comprising a coil, a bridge-like fulcrum secured above the top of said coil, an arm pivotally connected to said electro-magnetic device and extending across the top of said coil and beneath said fulcrum, a lever pivotally connected intermediate its ends to the distal end of said arm, said lever extending in one direction over said fulcrum and in the opposite direction to an end operatively connected to a corresponding display.

References Cited by the Examiner

UNITED STATES PATENTS

| | | | |
|---|---|---|---|
| 933,075 | 9/1909 | Hollingsworth | 40—79 |
| 1,175,051 | 3/1916 | Darrow | 340—124 |
| 1,240,380 | 9/1917 | Singer | 340—124 X |

EUGENE R. CAPOZIO, *Primary Examiner.*

W. GRIEB, *Assistant Examiner.*